United States Patent
Mahfouz et al.

(10) Patent No.: US 10,253,245 B1
(45) Date of Patent: Apr. 9, 2019

(54) METHOD FOR PREVENTING FORMATION OF WATER-OIL EMULSIONS USING ADDITIVES

(71) Applicant: Saudi Arabian Oil Company, Dhahran (SA)

(72) Inventors: Remi Mahfouz, Lyons (FR); Aziz Fihri, Paris (FR); Enrico Bovero, Dhahran (SA); Abdullah A. Shahrani, Dammarn (SA); Haitham Aljahani, Khobar (SA); Abdullah S. Al-Ghamdi, Dammarn (SA); Ihsan Taie, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 20 days.

(21) Appl. No.: 15/723,818

(22) Filed: Oct. 3, 2017

(51) Int. Cl.
*E21B 43/25* (2006.01)
*C09K 8/58* (2006.01)
*E21B 43/20* (2006.01)

(52) U.S. Cl.
CPC ............... *C09K 8/58* (2013.01); *E21B 43/20* (2013.01); *C09K 2208/10* (2013.01)

(58) Field of Classification Search
CPC ...................................................... C09K 8/58
See application file for complete search history.

(56) References Cited

U.S. PATENT DOCUMENTS

| | | | |
|---|---|---|---|
| 3,396,792 A * | 8/1968 | Muggee | C09K 8/592 166/270.1 |
| 4,592,849 A | 6/1986 | McMillen | |
| 5,335,732 A | 8/1994 | McIntyre | |
| 5,762,138 A * | 6/1998 | Ford | C09K 8/52 166/279 |
| 6,189,613 B1 | 2/2001 | Chachula et al. | |
| 6,315,042 B1 | 11/2001 | Griffith et al. | |
| 8,616,272 B2 | 12/2013 | Mazyar et al. | |
| 9,518,211 B2 | 12/2016 | Kimura et al. | |
| 9,579,616 B2 | 2/2017 | Malloggi et al. | |
| 2012/0181033 A1 | 7/2012 | Saini et al. | |
| 2013/0228529 A1 | 9/2013 | Guo et al. | |
| 2014/0076815 A1 | 3/2014 | Tan et al. | |
| 2014/0096969 A1 * | 4/2014 | Ali | C09K 8/68 166/308.1 |
| 2014/0224733 A1 | 8/2014 | Osness et al. | |
| 2014/0275589 A1 * | 9/2014 | Blankenburg | B01D 17/047 554/19 |
| 2016/0060503 A1 * | 3/2016 | Chakraborty | C09K 8/58 166/280.2 |
| 2016/0175432 A1 | 6/2016 | Ma et al. | |
| 2017/0174978 A1 | 6/2017 | Giro et al. | |

* cited by examiner

*Primary Examiner* — William D Hutton, Jr.
*Assistant Examiner* — Avi T Skaist
(74) *Attorney, Agent, or Firm* — Leason Ellis LLP

(57) ABSTRACT

A method of preventing formation of a water and oil emulsion in a downhole formation containing oil, the method comprises preparing a dispersion of water and a plurality of nanoparticles, each nanoparticle in the plurality of nanoparticles having a size of at least 300 nanometers, and injecting the mixture downhole into contact with the oil downhole. Presence of the plurality of nanoparticles prevents formation of an emulsion between the injected water and the oil.

6 Claims, 2 Drawing Sheets

METHOD FOR PREVENTING FORMATION OF WATER-OIL EMULSIONS USING ADDITIVES

FIELD OF THE INVENTION

The present invention relates to the problem of preventing formation of water-oil emulsions to enhance oil recovery in the oil and gas industry. In particular, the present invention relates to a method for separating water and oil emulsions using additives at various stages of the oil production process.

BACKGROUND OF THE INVENTION

During downhole oil extraction, water is injected to apply pressure and aid in the forcing of oil out of tight formations in reservoirs. A disadvantageous effect of adding water is the production of oil-water emulsions, from which the oil portion is challenging to extract. Water-oil emulsions can also be formed at other stages and locations including during drilling, producing, transporting and processing, in hydrocarbon reservoirs, well bores, surface facilities, transportation systems and refineries. During field production, as the percentage of the water in the emulsions, known as the "water cut" can reach to up to 90% of the total.

An emulsion is generally defined as a heterogeneous liquid system consisting of two immiscible liquids where one the liquids is totally dispersed as droplets in the second liquid. The emulsions can be classified into three broad groups: water in oil (W/O), oil in water (O/W) and multiple or complex emulsions. The formation and the stability of water-oil emulsions have been widely investigated. The stability and enhancement of emulsions formation can be affected by several parameters such as water/oil ratio, emulsifier/surfactant ratio, the presence of solids, surface tension, presence of a high boiling point fraction (e.g. asphaltenes, resins, organic acids), temperature, salinity and pH.

Techniques are currently in development to enhance the water injection performance and reduce the water cut during the production life of oil reservoir. These techniques seeks to minimize the added water using inflow control devices, treat and dispose water at the surface, and separate water from oil downhole in reservoirs. Specific techniques and mechanism include hydrocyclone, gravity separators, and centrifugal separator for separation of oil from water coupled with supplemental technologies such as mechanical blocking devices (e.g. packer and plugs) and water additives (e.g., polymer gel, nanoparticles).

In the past decade, studies showed that nanoparticle additives including metal oxides and carbon nanotubes can be used to enhance the oil recovery. Due to their characteristics including wettability, interfacial tension reduction and viscosity modification capability, and their stability in injected fluid, nanoparticles are potential candidates to be used to increase oil recover from water-oil emulsions.

However, the techniques disclosed to date employ combinations of particles with chemical additives, and utilize particle size ranges (<50 nanometers) that are suited for combinations with the chemical additives.

What is therefore needed is a cost-effective, easy-to-implement and effective technique for separating or preventing water-oil emulsions at various stages of the oil production process.

SUMMARY OF THE INVENTION

Embodiments of the present invention provide a method of preventing formation of a water and oil emulsion in a downhole formation. The method comprises preparing a dispersion of water and a plurality of nanoparticles, each nanoparticle in the plurality of nanoparticles having a size of at least 300 nanometers (e.g., a diameter), and injecting the mixture downhole into contact with the oil downhole. Presence of the plurality of nanoparticles prevents formation of an emulsion between the injected water and the oil. In preferred embodiments, the plurality of nanoparticles are composed of silica.

In some implementations, the water injected is distilled, and the plurality of nanoparticles are dispersed in the water at a concentration of approximately 0.2 weight percent. In other implementations, in which the water contains salt, the plurality of nanoparticles are dispersed in the water at a concentration of approximately 1.6 weight percent. In implementations that employ salt water, the salt water used can have a salt concentration of approximately 3.5 weight percent.

Each of the nanoparticles in the plurality of nanoparticles preferably has a size (e.g., a diameter) in a range of about 300 nanometers to about 500 nanometers.

Embodiments of the present invention also include a composition for use in preventing formation of water and oil emulsions comprising a dispersion of water and a plurality of nanoparticles, each nanoparticle in the plurality of nanoparticles having a size (e.g., a diameter) of at least 300 nanometers. In preferred embodiments, the plurality of nanoparticles are composed of silica and each has a size (e.g., a diameter) in a range of about 300 nanometers to about 500 nanometers.

In some implementations the water is distilled and the plurality of nanoparticles are dispersed in the water at a concentration of approximately 0.2 weight percent. In other implementations, the water further includes salt, and the plurality of nanoparticles are dispersed in the water at a concentration of approximately 1.6 weight percent. In implementations that employ salt water, the salt water used can have a salt concentration of approximately 3.5 weight percent.

Any combinations of the various embodiments and implementations disclosed herein can be used.

These and other aspects, features, and advantages can be appreciated from the following description of certain embodiments of the invention and the accompanying drawing figures and claims.

DETAILED DESCRIPTION CERTAIN OF EMBODIMENTS OF THE INVENTION

The disclosure herein pertains to a method of separating oil from the water in emulsions by addition of nanoparticles. In particular, the inventors have determined that water of low salt concentration can be separated from oil in emulsions by addition of nanoparticles of over 300 nanometers in size, at a concentration of approximately 0.2% ($W_{particles}/W_{water}$) or higher, and that salty water can be separated from oil in emulsions by addition of similarly-sized nanoparticles at a concentration of approximately 1.6% ($W_{pt}/W_{wt}$) or higher. The nanoparticles can be added with water injection to separate emulsions in downhole locations.

In embodiments in which the nanoparticles are spherical, the diameter is preferably over 300 nanometers, and more preferably in a range between about 300 nanometers and about 500 nanometers.

Experiments have been conducted to investigate the behavior of water (both distilled and salty (3.5%)) having dispersions of silica nanoparticles of varying concentrations and sizes on the formation of emulsions with Arabian heavy crude oil. The silica nanoparticles used in the experiments were synthesized at different sizes (30 nm 100 nm, 200 nm and 350 nm) using the Stöber process which is used to prepare silica particles of uniform size. The nanoparticles were dispersed in the distilled water and salty water by sonication for 1 hour. The resulting slurry was used as a component with Arabian crude oil for testing their ability to separate water-oil emulsions. The testing employed the ASTM D-1401 standard (the American Society for Testing and Materials "Standard Test Method for Water Separability of Petroleum Oils and Synthetic Fluids").

Figure 1:
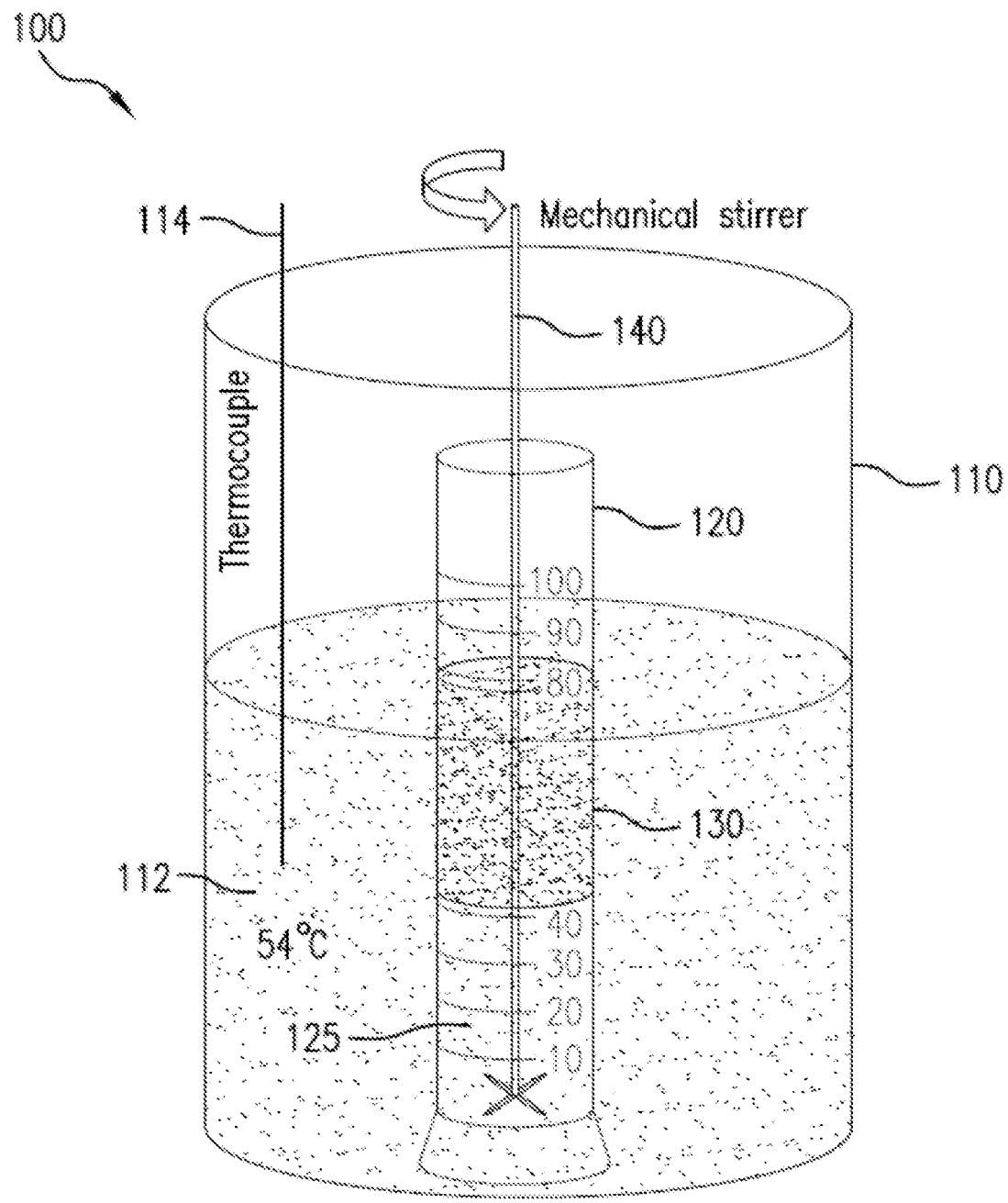
FIG. 1 is a schematic illustration of an exemplary apparatus for testing separation of water and oil using the ASTM D-1401 standard with which the compositions according to the present invention were tested.

FIG. 1 is a schematic illustration of an exemplary test apparatus 100 that can be used in the ASTM D-1401 test method. The test apparatus comprises a first container 110 containing a bath of water 112 having a controllable using a thermocouple 114. Placed within first container 110 is a graduated cylinder 120 of, for example, 100 ml capacity. In the test, graduated cylinder 120 is filled up to a first level (e.g., 40 ml) with a layer of distilled or salty water 125. On top of the water layer 125, graduated cylinder 120 is filled to a second level (e.g., 80 ml) with a layer of crude oil 130. In order to mix the water layer 125 with the crude oil layer 130, a mechanical stirrer 140 is disposed within the cylinder 120 and operative to rotate at a high rate (e.g., 1500 rpm).

In the experiments conducted, the water bath 112 was maintained at either 54° C. or 82° C., depending on the viscosity of the test specimen or sample specification. The mechanical stirrer 140 was operated to stir layers 125, 130 at 1500 rpm for 5 minutes, sufficient to thoroughly mix the water and oil phases into a single phase emulsion. The fluid in the cylinder 120 was carefully observed and recordings were made until final separation of the emulsion occurred. The test results at different particles size, concentration and medium are summarized in Table 1 directly below.

TABLE 1

| Water/Oil Ratio | Water Type | Weight % Particles in Water | Particles size (nm) | Emulsion formation | Separation Volume after test |
| --- | --- | --- | --- | --- | --- |
| $1_v/1_v$ | Distilled | 0 | — | Full | Non |
| $1_v/1_v$ | Distilled | 0.2 | 30 | Full | Non |
| $1_v/1_v$ | Distilled | 1.6 | 30 | Full | Non |
| $1_v/1_v$ | Distilled | 0.2 | 100 | Full | Non |
| $1_v/1_v$ | Distilled | 0.2 | 200 | Full | Non |
| $1_v/1_v$ | Distilled | 0.4 | 200 | Full | Non |
| $1_v/1_v$ | Distilled | 0.2 | 350 | Yes-4 ml | 1 min--32 ml<br>5 min--36 ml |
| $1_v/1_v$ | Salty (3.5%) | 0 | — | Full | Non |
| $1_v/1_v$ | Salty (3.5%) | 0.2 | 350 | Full | Non |
| $1_v/1_v$ | Salty (3.5%) | 0.4 | 350 | Full | Non |
| $1_v/1_v$ | Salty (3.5%) | 0.8 | 350 | Full | Non |
| $1_v/1_v$ | Salty (3.5%) | 1.6 | 350 | Yes-8 ml | 1 min--22 ml<br>2 min--26 ml<br>5 min--30 ml<br>10 min--32 ml |

TABLE 1-continued

| Water/Oil Ratio | Water Type | Weight % Particles in Water | Particles size (nm) | Emulsion formation | Separation Volume after test |
| --- | --- | --- | --- | --- | --- |
| $1_v/1_v$ | Salty (3.5%) | 3 | 350 | Yes-7 ml | 5 min--20 ml<br>7 min--25 ml |

10 min—30 ml
30 min—33 ml

As can be discerned from the results shown in Table I above, in distilled water, silica nanoparticles of 350 nm size demonstrated very effective separation behavior at low concentration of 0.2% ($W_{particles}/W_{water}$). At 350 nm, 36 ml volume of separated fluid was obtained with the particles are still present in the water phase. In contrast, silica nanoparticles with particles size <200 nm did not demonstrate comparable separation behavior even at higher concentrations of 0.4 or 1.6% ($W_{particles}/W_{water}$). Instead, a single phase non-separated emulsion was obtained at different concentrations and different particles sizes (30 nm, 100 nm and 200 nm).

Due to their demonstrated ability to separate water-oil emulsions in distilled water, the 350 nm size silica nanoparticles were also selected for emulsions tests with salty water (3.5% salt concentration). The results of the salt water tests demonstrate that the concentration of nanoparticles has a pronounced impact on the separation effect. At under 0.8% $M_{particles}/M_{salty}$ water (i.e., 0.2% and 0.4%), the nanoparticles did not shows effectiveness in demulsification, as the emulsion remained stable for 24 hours. At the higher 1.6% concentration level, 33 ml of separation was obtained after 10 min. These results indicate that in salty water the separation effect of the silica nanoparticles tends to be slower and less effective than in distilled water. For instance, in distilled water 36 ml of separation were obtained within 5 minutes, whereas in salty water, separation of only 33 ml was obtained after 10 minutes, twice as long. However, when the concentration of nanoparticles was increased further to 3%, results did not show any improvement in separation ability. Accordingly, it is found that 1.6% is an nanoparticle optimal concentration (using 350 nm nanoparticles) for salty water-oil separation. Accordingly, for downhole water injection, the test results indicate use of silica nanoparticles with particles size >300 nm and a concentration of 0.2% in distilled water, and at 1.6% in salty water (3.5%), in order to reduce the emulsion formation in the reservoir. This process will help to reduce the water cut in downhole reservoir and then will improve the oil recovery and increase the oil production.

In addition, in order to clearly demonstrate the effect of silica nanoparticles, a blank test (control) was included using distilled water and salty water with the Arabian Heavy crude without silica nanoparticles. In this case, the emulsions remained stable after 24 hours of the test.

Figure 2:
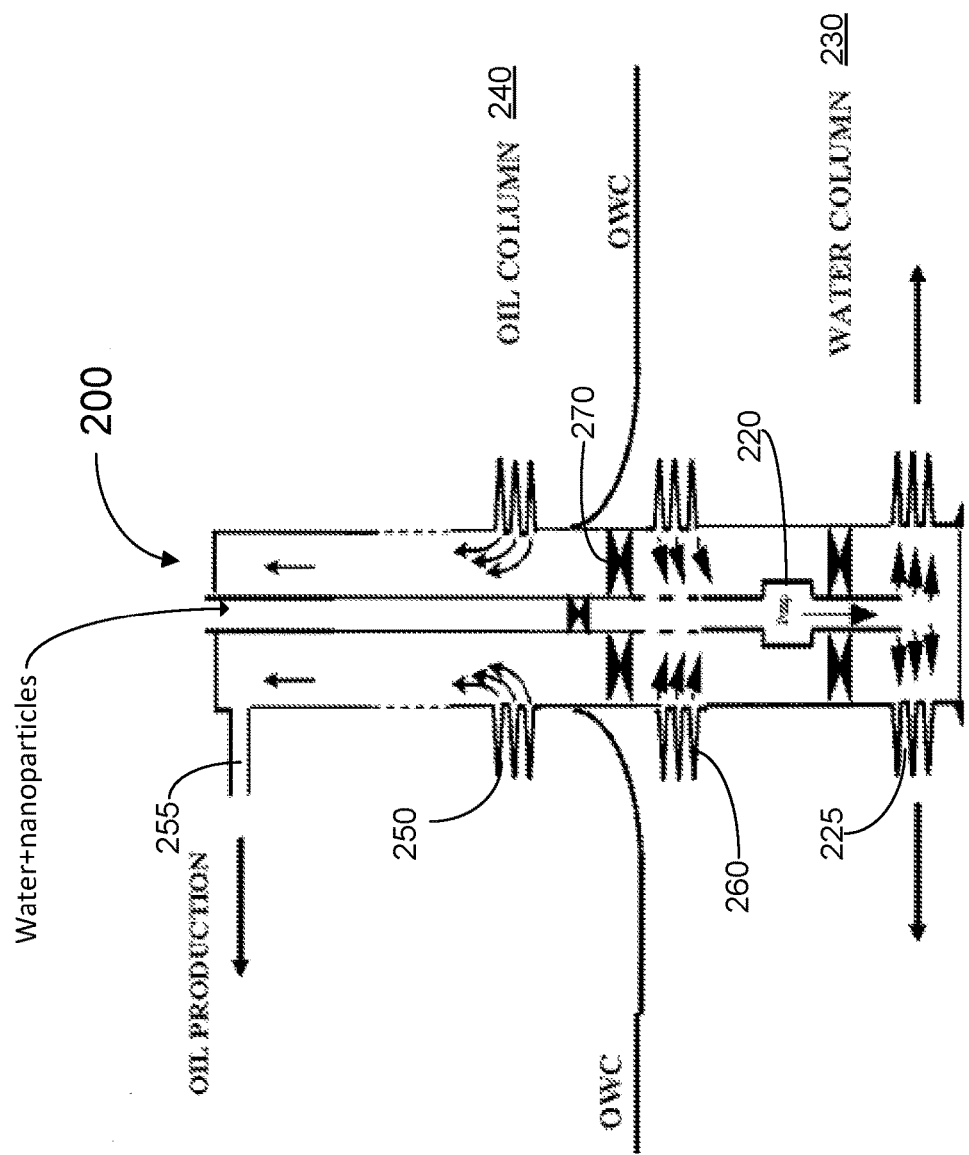
FIG. 2 is a schematic cross-section of an oil production drill-hole into which water with nanoparticles according to embodiments of the present invention can be injected to prevent emulsion formation.

FIG. 2 is a schematic cross-section of an oil production drill-hole 200. The drill-hole has a depth that reaches a downhole oil reservoir. A water pump 220 is situated within the drill-hole 200 is operative to inject water at pressure through later water outlets 225 in the drill hole. Ideally, the water that is injected exerts pressure on overlying oil deposits without mixing with the oil. In this manner, the injected water forms a water column 230, separate from an oil column 240. The pressure that the injected water exerts on the oil column forces oil to flow through lateral inlets 250 into the drill hole, and eventually through an outlet 255. Similarly, injected water cycles back to the drill hole through water inlets 260. A series of valves e.g., 270 are operative to keep oil that enters drill-hole 200 through inlets 250 separate from the water that enters the drill hole through inlets 260.

In practice, as noted in the Background section above, it is difficult to keep the downhole oil and water phases completely separate from one another without added measures, particularly as the phases are under pressure. By adding silica nanoparticles of 300 nanometers or greater at the concentrations appropriate for the water salinity with the injected water, it is possible to promote and maintain the separation of the oil and water phases in the downhole formation. By keeping the phases separate, the oil that flows into the drill hole tends to have a low water content.

The composition of water and nanoparticles 300 to 500 nanometers in size is cost-effective, plentifully available, eco-friendly and has high water-oil separation efficiency at low loading. These advantages make this composition an attractive alternative to other separation methods that do not have this combination of characteristics. The production of nanoparticles can also be scaled up to the levels suitable for large oil production facilities. When used at large scale, it is expected that the techniques of the present invention can have an appreciable effect on reducing water cut and improving the efficiency of oil recovery.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of preventing formation of a water and oil emulsion in a downhole formation containing oil, the method comprising:
preparing a dispersion of water and a plurality of spherical nanoparticles, each spherical nanoparticle in the plurality of nanoparticles having a size within a range of between about 300 nanometers and about 500, wherein the preparing step comprises:
providing the plurality of nanoparticles of uniform size within the range; and
dispersing the plurality of nanoparticles in the water by sonication to define a slurry;
injecting the so-prepared slurry downhole into contact with the oil downhole,
wherein presence of the plurality of nanoparticles prevents formation of an emulsion between the injected water and the oil.

2. The method of claim 1, wherein the plurality of nanoparticles are composed of silica.

3. The method of claim 1, wherein the water is distilled, and the plurality of nanoparticles are dispersed in the water at a concentration of approximately 0.2 weight percent.

4. The method of claim 1, wherein the water contains salt, and the plurality of nanoparticles are dispersed in the water at a concentration of approximately 1.6 weight percent.

5. The method of claim 4, wherein the water has a salt concentration of approximately 3.5 weight percent.

6. The method of claim 1, wherein the step providing the plurality of nanoparticles of uniform size within the range is performed using a Stöber process.

* * * * *